(12) United States Patent  
Kanter

(10) Patent No.: US 9,213,085 B2  
(45) Date of Patent: Dec. 15, 2015

(54) SYSTEM AND METHOD FOR MEASURING THE PHASE OF A MODULATED OPTICAL SIGNAL

(71) Applicant: Gregory S. Kanter, Chicago, IL (US)

(72) Inventor: Gregory S. Kanter, Chicago, IL (US)

(73) Assignee: Nucript LLC, Evanston, IL (US)

( * ) Notice: Subject to any disclaimer, the term of this patent is extended or adjusted under 35 U.S.C. 154(b) by 308 days.

(21) Appl. No.: 13/768,652

(22) Filed: Feb. 15, 2013

(65) Prior Publication Data

US 2014/0233942 A1   Aug. 21, 2014

(51) Int. Cl.
*G01S 7/48* (2006.01)
*H04B 10/70* (2013.01)
*G01S 17/10* (2006.01)
*G01S 17/58* (2006.01)
*G01S 7/486* (2006.01)

(52) U.S. Cl.
CPC ............ *G01S 7/4808* (2013.01); *G01S 7/4865* (2013.01); *G01S 17/102* (2013.01); *G01S 17/107* (2013.01); *G01S 17/58* (2013.01); *H04B 10/70* (2013.01)

(58) Field of Classification Search
CPC ... G01J 1/44; H01L 31/03046; H01L 31/107; H03G 3/20; H01J 40/14
See application file for complete search history.

(56) References Cited

U.S. PATENT DOCUMENTS

| | | | | |
|---|---|---|---|---|
| 5,455,588 A * | 10/1995 | Lew et al. | ...................... | 342/104 |
| 6,697,148 B1 * | 2/2004 | Hopwood et al. | ............ | 356/28.5 |
| 7,675,610 B2 * | 3/2010 | Redman et al. | ............... | 356/5.03 |
| 7,705,284 B2 * | 4/2010 | Inoue et al. | ................ | 250/214 R |
| 2012/0076503 A1 * | 3/2012 | Habif | ............................ | 398/140 |
| 2012/0294625 A1 * | 11/2012 | Dynes et al. | ................... | 398/155 |

* cited by examiner

*Primary Examiner* — Luke Ratcliffe  
(74) *Attorney, Agent, or Firm* — Nadya Reingand

(57) ABSTRACT

The invention is related to phase detection in lidar systems using single photon detectors (SPDs). The frequency at which the SPDs are time gated is related to but not an integer multiple of the frequency of the transmitted optical pulses. Each return optical pulse arrives with a particular temporal position with respect to the nearest gate, and thus is detected with a related detection efficiency. The SPD output can be segmented into multiple time-multiplexed signals whose relative detection efficiency reveals the phase of the optical return pulses, and no such phases have negligible detection efficiency for all the time-multiplexed signals. To mitigate the impact of afterpulsing and other saturation effects, when a first optical pulse is detected with high detection efficiency the next optical pulse that is detected with high detection efficiency is separated by a time period about equal to or greater than the detector dead time.

15 Claims, 7 Drawing Sheets

SYSTEM AND METHOD FOR MEASURING THE PHASE OF A MODULATED OPTICAL SIGNAL

STATEMENT REGARDING FEDERALLY SPONSORED RESEARCH OR DEVELOPMENT

The United States Government has certain rights to this invention pursuant to contract W911NF-11-C-0248 from the US Army.

CROSS-REFERENCE TO RELATED APPLICATIONS

This invention claims priority to the U.S. Provisional application No. 61/599,531 filed Feb. 16, 2012.

FIELD OF THE INVENTION

The present invention relates to measuring small quantities of light, for instance in applications in optical ranging, imaging, or velocity measurements.

BACKGROUND

Optical signals do not diffract as much as radio frequency (RF) signals. This makes them useful for a variety of ranging and imaging radar-like applications using relatively small apertures. One common light detection and ranging (lidar) method is a phase-shift method where an optical signal is modulated by a RF frequency, and the phase of the RF frequency of the return optical signal (the return optical signal is the signal that bounces off an object to be measured and returns to the transceiver) is measured thus giving information about the distance to the object. The phase can be monitored over time (a phase change with respect to time is equivalent to an RF frequency shift) to determine the speed of the object with respect to the transceiver. Avalanche photodiodes (APDs) are sometimes used as the optical detector since they have a large internal gain making them sensitive to the small levels of return light typically encountered, especially when the transceiver and object are far apart. The electrical signal from the APD can be mixed with an RF local oscillator in a mixer to translate the received signal frequency down to a level where signal processing can more easily be performed.

It would be advantageous in terms of sensitivity to use a single photon sensitive detector (SPD). However, such detectors are not generally linear with respect to the input optical signal, thus a traditional mixer is not necessarily a preferred component for processing the SPD output. APD's can be operated in a SPD mode (the Geiger mode) where they are sometimes used in lidar to measure the time-of-flight of a pulse from a transmitter to the object and back again because of their very high sensitivity to small levels (single photons) of reflected light. The time-of-flight can be translated into distance to the object since the speed of light is constant. The optical pulse repetition rate in a time-of-flight scheme is typically quite low, making it difficult to perform velocity measurements or fast measurements suitable for imaging when using SPDs.

When using a phase shift detection method for the purposes of measuring velocity or for measuring distance to a high resolution, it is advantageous if the RF frequency of the optical modulation is high, for instance in the GHz range, since a higher frequency makes a small distance displacement cause a relatively large change in phase. Unfortunately the fairly high bandwidth APDs required in such a situation will typically have a poorer optical sensitivity specification. The RF output signal from an APD operating in linear mode can be mixed with a RF local oscillator to bring the received signal frequency down to a level where signal processing can more easily be performed. As an example, if the RF modulation signal is $f_m=3$ GHz then the expected Doppler frequency shift is $\delta f \sim 2 \cdot f_m \cdot v/3 \times 10^8 = 20 \cdot v$ Hz where v is the relative speed in m/s between the transceiver and the object and $3 \times 10^8$ m/s is the speed of light. For an object moving at 10 m/s the corresponding frequency shift is 200 Hz. The frequency shift is proportional to $f_m$, which makes the use of high modulation frequencies attractive. The ~3 GHz mean frequency can be mixed with an RF local oscillator of, say 3 GHz+100 kHz in a mixer, thus creating a manageable 100 kHz intermediate frequency (IF) signal when v=0. By monitoring the output frequency of the mixer, the magnitude and direction of the relative object velocity can be measured. The phase of the output frequency of the mixer can be monitored in order to measure the range to the object, with a ranging ambiguity of modulo $2\pi$, which in this case leads to an unambiguous range $d_{unambiguous}=c/(2 \cdot f_m)$ of 5 cm. There are various ways of extending the ranging ambiguity that are known in the art, such as the use of multiple modulation frequencies (U.S. Pat. No. 5,589,928). The highest modulation frequency typically limits the ranging resolution.

FIG. 1 shows a possible implementation of a phase shift ranging and/or velocity measurement system that is consistent with the aforementioned discussion and prior art. A continuous wave (CW) laser 100 is modulated in a modulator 102 by a high frequency sinusoidal wave generated in an oscillator 101. A sinusoidal wave is imparted to the amplitude of the laser light via the modulator and sent to an object through an optical antenna 104. A small portion of the transmitted light is reflected and returns to the transceiver 100 through a receive optical antenna 108. The return light is sent to an APD 110 operating in linear mode which converts the received optical signal into an electrical signal. The oscillator 101 is frequency shifted by a fixed amount in a frequency shifter 106. The output of the frequency shifter is mixed with the analog APD output in a mixer 114 and the resulting return signal is digitized in a signal analog-to-digital converter (ADC) 116 the output of which is sent to the processor 122 for processing. A reference signal obtained by mixing the frequency shifted light from the frequency shifter and the oscillator output signal in a reference mixer 118 is digitized using a reference ADC 120 and the digitized reference signal is sent to the processor. The frequency difference between the digitized reference signal and the digitized return signal contains the relative velocity information and the phase difference contains range information. This example is illustrative and the actual components that are employed can be modified, as can the type of modulation and other modifications as is known in the art. The system allows the phase of a return optical signal to be monitored as a function of time and used to determine either range and/or velocity information of the object.

It would be advantageous in terms of sensitivity to use a single photon sensitive detector (SPD). However, such detectors are not generally linear with respect to the input optical signal so they are not well suited for the phase shift measurement of FIG. 1. For instance, APDs operating as SPDs often incorporate digitizers for operating as digital output devices, typically generating a binary one level if one or more photons are detected in a given time frame or generating a binary zero level if no photons are detected. SPDs can have other linearity issues. For instance, an SPD can experience a time period directly after a photon is detected where the detector has some performance degradation such as a relatively high probability of detecting a photon even if none are present. Some SPDs effectively disarm the detector during this time period, which creates a detector dead time after a detection event where the detector is unable to detect additional photons. We will refer to the dead time more generally as a period of reduced performance after detection, since the detector can be disarmed during this period if needed.

A photon counting ladar system that does measure phase is described in U.S. Pat. No. 7,675,610 B2. This system modulates a laser with a chirped transmit waveform and gates the detector with the same waveform. The transmit modulation and gate modulation are thus the same signal (both frequencies change with time which is known as a chirp). By modulating the detector gain and low-pass filtering the resulting binary detector output this ladar system essentially mixes the transmit and receive frequencies. The received signal after mixing and filtering has a frequency that depends on the range to the object. The method requires chirped signal generation and its range resolution is limited by the chirp parameter. Range resolution is typically limited by ~c/2 B where B is the bandwidth of the chirp which for a 200 MHz chirp limits the range resolution to ~75 cm even if the APD detection time windows caused by the gates are sub-ns. It would be advantageous not to have to generate such chirped signals and to maintain a range resolution limited by the short sub-ns detection time windows possible with gated APDs rather than being limited by the chirp bandwidth.

Additionally U.S. Pat. No. 7,675,610 B2 does not mitigate the impact of detector dead time since the optical signal and gated photon detection window are overlapped for many consecutive gates. This limits the linearity of the system and reduces the number of photons that can be detected when the received signal is high. For instance, if the mean gating frequency is ~2 GHz and the low pass filtered signal (whose frequency depends on the range to the object) is 25 MHz, then the gates and optical pulses will move from being very well overlapped (high detection efficiency) to very poorly overlapped (near zero detection efficiency) and back again over the course of 80 gates. If the detector time-gates create a high detection efficiency region with a 20% duty cycle (125 ps time windows of the ~500 ps gate repetition rate having high detection efficiency) then for about 16 consecutive gates (or 8 ns) the optical signal will be well overlapped with the gates (thus having high detection efficiency) while for the remaining 64 gates they are poorly overlapped. However, if the detector dead time is 8 ns then even if the optical signal is very large (say many 10's of photons per pulse) the detector count rate will saturate at about one counts during each 40 ns cycle. Such a design limits the linearity of the system. It would be more optimal if the counts were more evenly spaced throughout the detection process, ideally spaced by at least the detector dead time, so that the process could be more linear over a wider dynamic range of the input photon flux. If this could be done, then the equivalent maximum count rate would be ~40 ns/8 ns=5 counts per 40 ns.

Prior art has used phase shift detection in the RF domain (U.S. Pat. No. 5,455,588) and optical domain (U.S. Pat. No. 6,697,148). Single photon detectors have been used in lidar including with the use of modulated pulse streams for time-correlated single photon counting (McCarthy et al, *Applied Optics* 48 pp 6241-6251, 2009), but these systems used a free running (ungated) detector. High speed gated single photon detectors have been previously used in lidar (Min Ren et al, "Laser ranging at 1550 nm 1-GHz sine-wave gated InGaAs/InP APD single-photon detector," *Opt. Express* 19, 13497-13502, 2011), but the gate and optical pulse repetition frequencies were unsynchronized and the optical pulse rate was much smaller than the detector gate rate. This 'free running' gated mode is used as a proxy for an un-gated APD since ungated APDs are difficult to realize in the 1550 nm band. The ungated or the gated free running modes do not typically measure phase but rather the time of flight of the laser pulse to and from the object. This does not typically make for fast measurement times nor is it conducive to measuring velocity.

Applying a time-gated voltage across an APD, and also some other types of SPDs like gated superconducting nanowire based SPDs (Mohsen K. Akhlaghi and A. Hamed Majedi, "Gated mode superconducting nanowire single photon detectors," Opt. Express 20, 1608-1616 (2012)) causes an unwanted signal to feed-through the device that makes detecting the small breakdown signals which indicate a photon detection more difficult. Detecting small breakdowns is beneficial since large charge flows cause greater trapped carriers which in turn causes an unwanted afterpulse effect where the device can break-down upon receiving a gate pulse even when no photons are present. This afterpulse effect can be controlled by waiting a suitably long time between gates to allow the carriers to disperse. However waiting a long time between gates slows down operation and in any event at high gating rates it is not always technically feasible to turn off the gate signal after a detection event. A method to account for afterpulsing when gating at high speeds is to continually gate the detector but ignore breakdowns recorded for a given time period after a photon is detected. This time period can be considered equivalent to the detector dead time.

Recent work in the field of single photon counting has suggested that the use of either a sine wave gate or the use of differential subtraction can allow small breakdowns to be detected using suitable analog processing to reduce the feed-through signal. A method that subtracts a reference signal from the SPD output has been proposed [patent application U.S. 2011/0127415 A1 by G. S. Kanter]. The reference signal subtraction method is relatively flexible, allowing for the gate frequency to be easily reconfigured.

What is needed is a system for measuring low photon levels that can identify the phase of the incoming signal. The system can be used for fast, precise ranging and velocity measurement and can make use of very sensitive single photon detectors. The system should be capable of high resolution ranging, but can also ideally allow for unambiguous ranging over long distances. The ranging resolution can exploit the short detection time windows possible by time-gating a single photon detector. A chirped signal should not be required. Issues stemming from the detector dead time or other linearity problems in SPDs should be mitigated to maintain the highest possible dynamic range and fastest signal acquisition. Practical components should be employed to construct the device.

SUMMARY

The invention herein uses a photon detector whose detection efficiency is gated in time at a frequency $f_G$ to detect a modulated optical signal. The modulated optical signal is sent from a transceiver to an object, and the small portion of the optical signal that reflects off the object and returns to the transceiver is measured by a sensitive single photon detector (SPD). The modulated optical signal can be a series of optical pulses at a given transmitter pulse repetition frequency $f_m$ and where the optical pulse temporal full-width at half maximum (FWHM) is characterized by $\tau_p$. Some or all the pulses can be intensity or otherwise modulated for the purposes of resolving range ambiguity (extending the range of unambiguous distance measurements). The SPDs, which can be realized by APDs in Geiger mode, are time gated so that the detection efficiency varies in time, and the high efficiency detection time window can be characterized by its FWHM $\tau_g$. The frequency at which the SPDs are time gated is related to but not an integer multiple of the frequency of the transmitted optical pulses and such that for a reflection from a stationary single object the gate and optical pulses arrive at (nearly) a fixed temporal relationship with respect to each other after an integer number of gates or pulses. We can set $f_G = M \cdot f_m$ where M is not an integer. Each return optical pulse will arrive with a particular temporal position with respect to the nearest gate, and thus be detected with a related detection efficiency. To mitigate the impact of afterpulses and other saturation effects, when a first optical pulse is detected with high detection efficiency the next optical pulse that is detected with high detection efficiency will be spaced by a time period about equal to or greater than the detector dead time. This is accomplished, for instance, when $f_G = M \cdot f_m$ where $M = I_2/I_1$ and $I_1$ and $I_2$ are relatively prime integers greater than one; and whereas $I_2/f_G$ is nearly equal to or larger than the dead time. In such a case, it is useful to set $\tau_G > \tau_p > (1 - \tau_G \cdot f_G)/(2I_1 \cdot f_G)$, where this constraint on the optical pulse width provides a high detection efficiency for optical pulses that overlap in time with the detector gates but also a non-negligible detection efficiency for at least one of $I_1$ consecutive optical pulses regardless of the phase shift (temporal position) of the optical pulses with respect to the gates.

The signal from the SPD can be thought of as a series of time-multiplexed sub-signals (or gate phases). The sub-signals can be grouped into L integer signals. If $L = I_2$ then when the $L^{th}$ gate phase is maximally overlapped with the optical pulses the $L-1$ other gate phases are not well overlapped with the optical pulses. Since the time window of the $L^{th}$ gate phase occurs at a time interval of $L/f_G$ which is longer than the detector dead time, no photon counts in this phase are lost due to the dead time and very few photon counts in other phases are lost due to the detector dead time since these phases naturally have a low detection efficiency. If the arrival time of the optical pulse does not overlap well with a gated detection window but is instead located in-between gates, then both gate phases surrounding the pulse will have a reduced detection efficiency which helps to mitigate detector saturation issues even though the two neighboring gates are spaced closer than the detector dead time. According to the design there are no phases of the optical signal that will cause all the L gate phases to have non-negligible detection efficiency. This eliminates zones where the phase of the return optical signal is not recoverable. The shape of the time-varying detection efficiency caused by the gate frequency causes a characteristic variation in the various L sub-signals as the optical phase changes such that each optical phase leads to a unique detection efficiency signature. Typically for all phases of the return optical signal at least one of the gate phases are in a position where the detection efficiency is very sensitive to the phase of the return optical signal, thus helping the system to have high measurement resolution.

An alternative design can set $M = (I_4 + \tau_G/s)/I_3$, where $s < 0.1$ is a system parameter, $I_3$ and $I_4$ are the two smallest integers for which the relationship holds, $I_4 > I_3$, and $I_4/f_G$ being equal to or larger than the dead time of the optical receiver. In this case the gate and optical pulses naturally walk off each other over time, so that a constraint on the optical pulse width is not necessary since the phase of the optical signal will only have non-negligible detection efficiency for a finite time period. One can set $L = I_4$ in this design.

After L gates the relative gate and pulse position repeats or very nearly repeats, allowing the gates to be segmented into L different time-multiplexed sub-signals (or gate phases) each with a different gate-to-pulse position. The optical pulses will arrive at a different relative position with respect to the gate for each of the L gate phases leading to L different detection efficiencies for each of the L time-multiplexed signals. The signal at each of the L gate phases is digitally processed to determine L digitally processed time multiplexed sub-signals. For instance, each of the L sub-signals may be processed by using a square temporal filter which effectively adds up the total number of detected photons over a fixed time period such as $I_4/(s \cdot f_G)$. The relative values of the L digitally processed sub-signals can be compared in order to determine the relative phase of the optical return pulses. The phase of the return pulses can be translated into the range of the object and the rate of change of the phase can be translated into the object velocity. The optical pulses can be further modulated, such as on/off modulated with a given pattern or modulated with different frequencies, in order to resolve range ambiguities that are larger than a $2\pi$ phase difference at a fixed modulation frequency. In such cases these modulations will have frequency components less than $f_m$.

In one embodiment the gated SPD is an APD gated with a sinusoidal signal and the sinusoidal feed through signal out of the APD is subtracted by using a subtraction element fed by the APD output signal and a reference sinusoidal signal. By controlling the amplitude and phase of the reference signal, the APD can be gated over a range of frequencies. This can be used to choose the appropriate frequency for a given measurement application. For instance, if the object is moving very quickly then the number of consecutive gates in a given gate phase that have high detection efficiency may be lower than desired leading to a high modulation frequency on the gate phase sub-signals. The DSP can then change the M value to lower the modulation frequency of the gate phase sub-signals such that they are in a more optimal range. M can be modified by changing $f_{12}$ or $f_G$, but for technical reasons such as if the laser is a pulsed mode-locked laser of fixed repetition rate it is advantageous to be able to modify $f_G$ which is can be done by employing the reference signal subtraction method on the APD.

In order to operate over a wider dynamic range, the peak detection efficiency of the SPD can be changed, for instance by changing the bias voltage to the APD or size of the magnitude of the gating voltage to the APD, so that the count rate in the various gate phases are within a desired range. For instance, if the object reflection is such that ~1 photon arrives per pulse and the peak detection efficiency is 10%, then ~10% of the pulses arriving at the gate phase with high temporal overlap with the optical pulses will lead to a photon count. If instead the number of received photons is 20 photons per pulse, then assuming Poisson statistics the number of pulses that cause a photon detection event will be $1 - e^{(-20 \cdot 0.1)}$ ~86.5%. This count rate is so high that the system is in a highly saturated mode, where the count rate does not depend linearly on the power of the signal. This saturation could be factored into any subsequent analysis to still determine the pulse phase. However, if count saturation is high the accuracy of the results may be reduced because the relative count rates in the various gate phases will no longer be linearly related to the detection efficiency and the afterpulsing effect that often accompanies APDs used in SPD mode may be exacerbated. It would be especially hard to determine the optical phase accurately if more than one detector phase experiences a substantial degree of saturation, which could occur for very high optical pulse intensities since in that case multiple gate phases with low detection efficiency can still become saturated. Thus, when the received photon levels are too high the system can reduce the detection efficiency of the APD thereby maintaining a desired range of count probabilities. Alternatively multiple measurements can be taken at different bias voltages and the results processed to more accurately determine the information from the return signal. Note that since all of the detector phase measurements are based off measurements from the same detector the detection efficiency of all the phases will be changed together when changing the bias voltage which is convenient for processing the signal.

DETAILED DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. In general, features described in one embodiment might be suitable for use in other embodiments as would be apparent to those skilled in the art.

Figure 2:
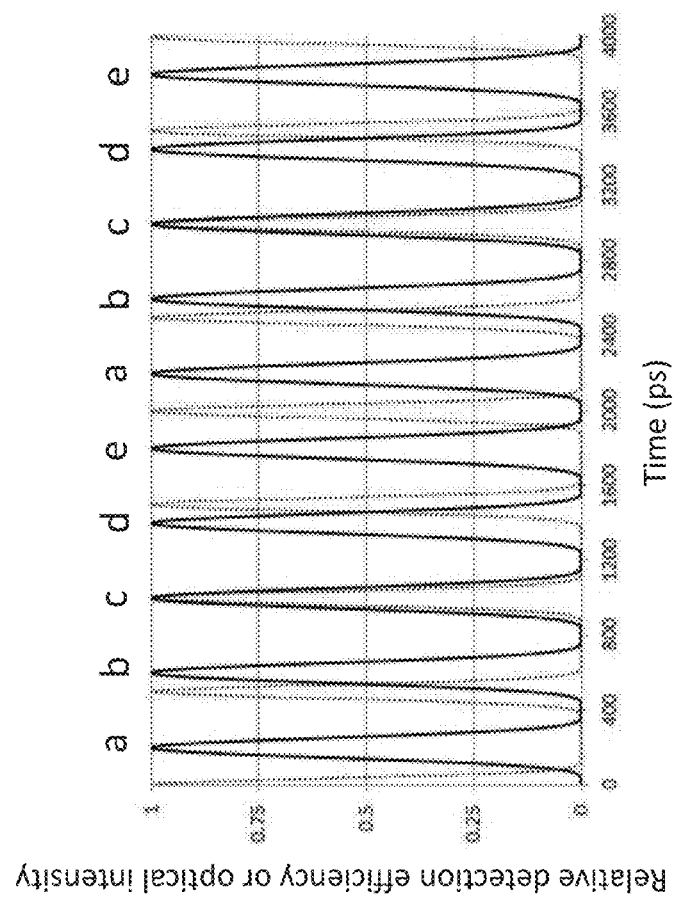
FIG. 2 shows the relative temporal position of optical return pulses (dotted lines) with respect to the gated detection efficiency (solid lines) of the SPD. The SPD gates can be grouped into five phases a, b, c, d, e each with a different relative location between the optical pulse and the gate.

FIG. 2 depicts the relative relationship between the return optical pulses and the temporal shape of the detection efficiency of the SPD in one embodiment of the invention. The temporal profile of the SPD detection efficiency is caused by time gating the SPD. The SPD is time gated with a $f_g=2.5$ GHz frequency (400 ps repetition rate) and the pulse repetition frequency is $f_m=2$ GHz (500 ps repetition rate). The gates are indexed into five separate time-multiplexed sub-signal labeled a, b, c, d, or e where every 5$^{th}$ gate is of the same phase index. $f_g=M \cdot f_m$ where $M=I_2/I_1$, with integers $I_2=5$ and $I_1=4$. The pulse/gate pattern repeats every 5 gates or 4 pulses for a stationary reflection. L time time-multiplexed sub-signals or gate phases where $L=I_2=5$ can be defined. The parameters for the gate and pulse FWHM are $\tau_g \sim 128$ ps and $\tau_p \sim 84$ ps. The dead time of the APD is ~1.8 ns. The time interval between two pulses in one gate phase is L·400 ps, or 2 ns which is longer than the APD dead time. The relative temporal shift of the optical pulse in each successive gate phase with respect to the gate is 100 ps. The system parameters satisfy $\tau_G > \tau_p > (1-\tau_G \cdot f_G)/(2 f_G I_1)$ since 128 ps>84 ps>34 ps respectively. Thus, as will be described, when one gate phase is experiencing a maximum count rate (high detection efficiency) the other gate phases all simultaneously have low count rates (low detection efficiency) thus helping the SPD avoid saturation issues. However, $I_1$ consecutive gate phases never all simultaneously experience negligible detection efficiencies. Typically at least one detector phase is in a temporal position with respect to the optical pulse such that at least one detector phase has a detection efficiency that is very sensitive to the optical pulse phase and thus the system has high resolution.

Given the particular phase of the optical return pulses (phase as defined by the pulse location with respect to the gates), which is variable and indicative of the object distance, FIG. 2 shows that the usable detection efficiency region of gate phase "a" is in a temporal location where there is almost no optical light. With the given optical pulse phase, summing the count rate from many gates in index "a" would thus produce a very low count rate. Gate phase "c" on the other hand arrives such that the detection efficiency is maximum during the pulse arrival. Thus gate phase "c" would have a large average count rate. Gate phases "b" and "d" arrive in locations where the pulse is detectable but with a fairly low detection efficiency (due to the poor overlap between the gate window and the pulse). Both the gate phases "b" and "d" will have a similar count rate which is lower than that of gate phase "c" but higher than that of gate phase "a". The temporal shape of the detection efficiency as a function of time due to the gate modulation is assumed to have a particular shape, and in FIG. 2 the shape is $\sin^6(\phi/2)$ where $\phi$ is the phase of the gate where the phase varies linearly in time such that the detection efficiency peaks every 400 ps. However different shapes can be used and the exact profile of the detection efficiency temporal shape can be measured experimentally and used in the resulting analysis. For short pulses the shape of the time varying SPD detection efficiency specifies how the detection efficiency varies with respect to the optical phase, which is used to measure said phase with high resolution.

Figure 3:
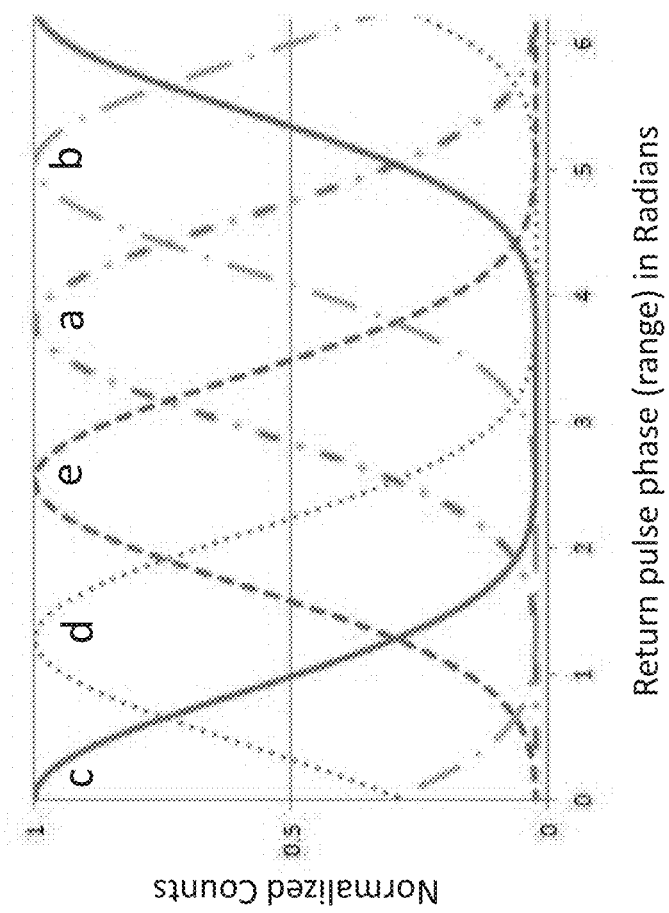
FIG. 3 shows the normalized number of counts in five different gate phases as the phase of the return optical pulses is varied.

FIG. 3 shows how the normalized count rate of each of the detection phases varies as the relative phase of the optical pulse arrival is shifted such that the optical pulses arrive at earlier times as the phase is increased. A phase shift of $2\pi$ is equivalent to a time shift of 500 ps which is a movement of the object of 250 ps·$3 \times 10^8$ m/s or 7.5 cm. At a phase shift of 0 radians we find the previously described situation where the count rate in gate index "c" is high while the count rate at indexes "b" and "d" are relatively low and the count rate of phase "a" and "e" are very low. As the pulse is delayed the count rate at index "d" increases while that of "c" and "b" fall, until the phase has shifted past $\pi/2$ radians in which case it is phase "e" whose count rate begins to rise substantially. This periodicity in the count rate (detection efficiency) of the various phases can be used to determine the optical return pulse phase unambiguously up to a $2\pi$ range, which at 2 GHz is equivalent to 7.5 cm as mentioned above. It is possible to change the pulse repetition rate to extend the unambiguous distance, in which case the gate frequency can be changed if desired as well or it can be held fixed. If much larger unambiguous distances are required then the pulses can be further modulated in order to determine the unambiguous range more efficiently, such as adding a fixed intensity modulation pattern onto the pulses.

It is useful if, as in FIG. 3, there are no return pulse phases for which all the detection phases yield a very low detection efficiency. This implies that there is no optical phase where all counts are simultaneously low, as this condition would be difficult to distinguish from a zero light level. Such an undesirable condition will happen for typical optical pulses ($t_p$ and $t_g$ both much shorter than the gate repetition time) when the gate frequency is an integer multiple of the pulse rate. If however the gate and optical pulse rate are related as $f_G = M \cdot f_m$ where $M = I_2/I_1$ and $I_1$ and $I_2$ are the smallest integers greater than one where the relationship holds and $I_1 \neq I_2$ ($I_1$ and $I_2$ being relatively prime), and wherein $\tau_p$ is about equal to or greater than $(1 - \tau_G \cdot f_G)/(2 \cdot f_G \cdot I_1)$, which in this case is satisfied since 84 ps>34 ps, then the undesirable condition will not occur since even if the optical pulses are temporally located so as to have a minimum overall detection efficiency some non-negligible detection efficiency will be observed. This can be understood by conceptually viewing the low-detection efficiency spacing in-between the gates as a $\sim(1-\tau_G \cdot f_G)$ fraction of the total gate period, and $I_1$ as the number of optical pulses that would need to fit in that time period for all the optical pulses to have low detection efficiency. If we can assume the energy of an optical pulse is nearly completely contained in a time span of $\sim 2\tau_p$, then we can imagine that to have low detection efficiency on all the optical pulses the low-detection efficiency spacing in between the gates should be able to be segmented into $I_2$ regions where the $\sim 2\tau_p$ wide optical pulses fall. Thus if $\tau_G$ is much smaller than $f_G$ and the width of the pulses is $2\tau_p = 1/(I_1 f_g)$ then all the pulse energy would just barely fit in the low detection region. Since $\tau_G$ is not completely negligible (in this example $\tau_G \cdot f_G = 0.32$) this means that some pulse energy would always be detected. Ideally the pulse width is also constrained from the other end as $\tau_p < \tau_G$ since this makes the contrast ratio high between a strong or a weak overlap between the gate and optical pulse. Also, ideally at least one of the L sub signals has a gate position that is highly sensitive to the phase of the return light signal thus making the system sensitive to small phase shifts. This is the case in FIG. 3 since for all phases from 0-2π there is at least one gate phase that has a normalized detection efficiency between ~0.3 and ~0.7, and in this region the slope of the normalized detection efficiency with respect to the optical phase is high. This design is thus advantageous for maintaining high resolution in the optical phase measurement.

Figure 1:
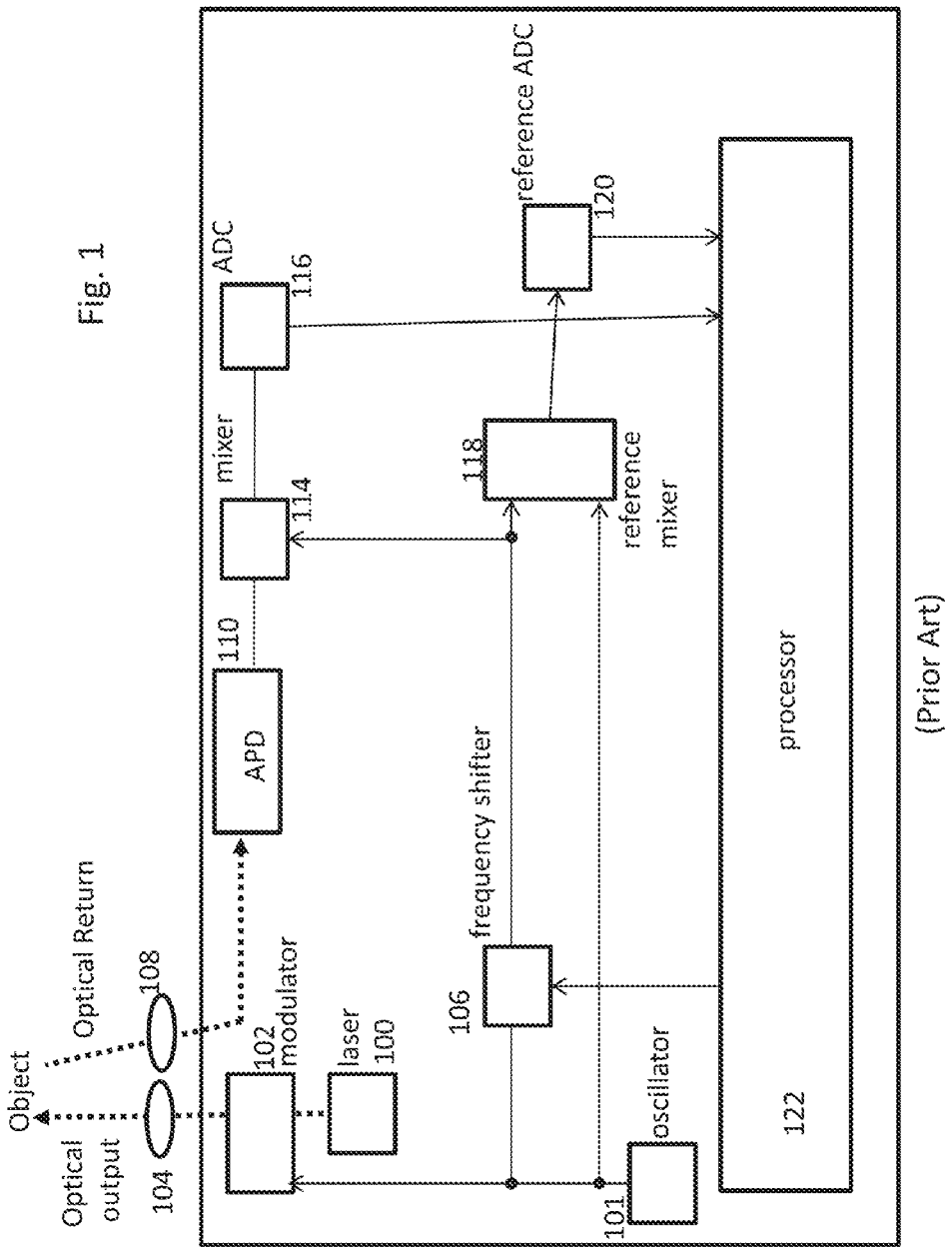
FIG. 1 is a functional block diagram of a phase-shift lidar system consistent with prior art.
Figure 4:
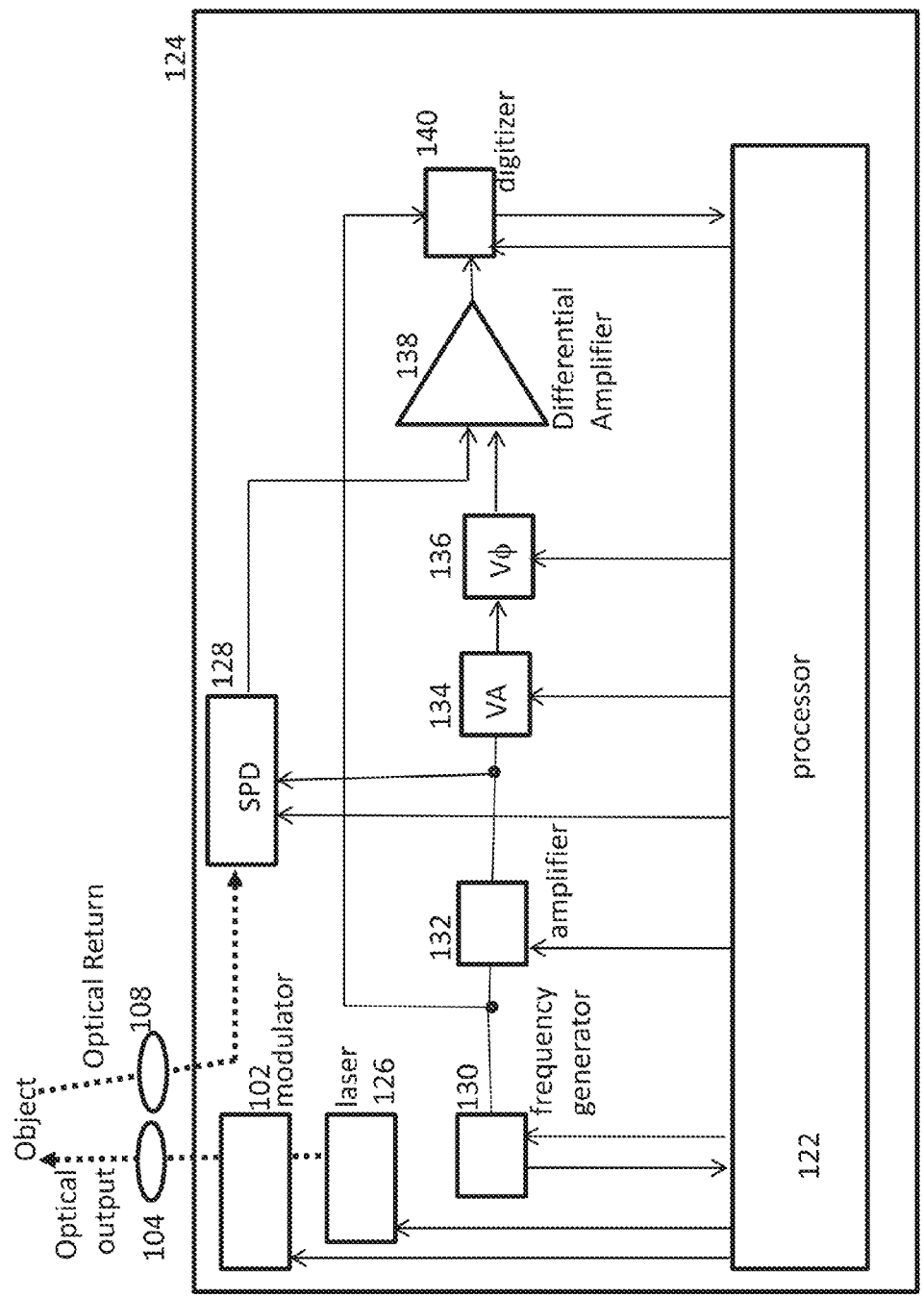
FIG. 4 is an embodiment of a single photon counting based phase shift lidar.

FIG. 4 is a block diagram of a SPD phase shift lidar system. Some of the components are the same as the system depicted in FIG. 1 in which case the same numbering scheme is used. The single photon sensitive phase-shift transceiver 124 contains pulsed laser 126 whose pulse frequency can optionally be controlled by a processor 122. The pulse frequency can be $f_m = 2$ GHz with 84 ps optical pulse duration. The pulsed laser can be realized by a mode-locked laser and the output pulses from the laser are modulated by a modulator. We note that alternatively the modulator can carve the pulses directly from a CW laser. The modulator is configured to intensity modulate the laser pulses with a given data profile. The data profile can be a fixed pattern. The fixed pattern ideally contains a higher percentage of 1's (optical pulse on) than 0's (optical pulse attenuated or turned off) so as to transmit the maximum amount of power while still producing a pattern that allows for the 2π ambiguity to be resolved. The length of the fixed pattern can be 2048 bits. Since each pulse is separated by 500 ps and the optical return is delayed by 2 d/c where d is the distance to the object, the maximum unambiguous distance becomes $d_{unambiguous} = 500 \text{ ps} \cdot 2048 \cdot 3 \times 10^8/2 = 153.6$ meters. The maximum unambiguous distance can be changed by changing the length of the fixed pattern or the pulse rate. The fixed pattern should be such that the pattern generated by collecting the data from every $5^{th}$ pulse is unique. This is because given the frequencies chosen in this example, every $5^{th}$ pulse arrives with a fixed relationship to a given gate phase and the data pattern for each gate phase should be unique for any distance within the unambiguous range.

The optical signal from the modulator is sent through an optical aperture 104, and the optical return signal reflected from the object is collected by second optical aperture 108. The collected optical return signal is sent to the optical input of an APD (128) operated in gated mode. Typically the APD is operated in Geiger mode where it is sensitive to single photons, but if the received optical power is suitably high it can be operated in linear mode with the gate signal modulating the linear gain. The APD DC bias is controlled by the processor 122, which also functions as the DSP, the processor thereby controlling the detection efficiency. The gate is generated in a frequency generator (130) at $f_G = 2.5$ GHz. The pulse/gate pattern repeats every 5 gates or 4 pulses. The gate frequency voltage signal out of the frequency multiplier is amplified by an amplifier 132 to a level which allows it to be used as the temporal gate to the APD, such as 8 volts peak-to-peak. A part of the temporal gate is tapped off and adjusted using a variable attenuator (VA) 134 and phase shifted in a variable phase shifter 136 to create a reference signal sent to a subtraction element 138. The variable amplifiers, attenuator, and phase shifter are all under the control of the processor which can change the levels for optimal performance. The electrical signal out of the APD is sent to a subtraction element 138 which can be realized by a differential amplifier so that the reference signal is subtracted and the resulting breakdown signal is amplified. The magnitude and phase of the reference signal are such that the undesired feedthrough from the APD is subtracted out leaving primarily the breakdown signal. Each gate is evaluated by a digitizer 140 which is clocked with the gate frequency and digitized during the breakdown time frame so as to determine if the gate breaks-down (detects a photon) or not. The threshold of the digitizer which sets the signal level that discriminates between a breakdown and no breakdown (detecting or not detecting a photon) is controlled by the processor and the digitized output of the comparator is sent to the processor 122 for further processing and evaluation.

The processor segments the gates into time multiplexed indexes of different phases, labeled a, b, c, d, and e. Every $5^{th}$ gate is in a different phase index. Note that the gate indexing could also be done by a time demultiplexer separating 5 consecutive SPD output signals into 5 outputs of the time demultiplexer representing the 5 different gate phases, and the resulting time demultiplexed outputs could be filtered using an analog filter. However in this case the combination of the time demultiplexer and the analog filters are essentially performing the demultiplexing and signal processing being performed by the processor in FIG. 4, so such functionally equivalent implementations are inherently incorporated in FIG. 4. The number of breakdowns in each gate phase over a fixed number of gates is counted by the processor, and the relative detection rate (ratio of breakdowns to valid gates) in each phase is compared to determine the distance to the object. The detection efficiency comparison can use a look up table to translate the detection efficiencies into an optical phase, or can use a fraction of the gate phases that are the most informative (for instance those that have relative detection efficiencies that are near the middle of the range), or can use other types of analysis methods. The relative detection rate in each phase may be time varying, in which case the time varying signal is analyzed to determine the velocity of the object with respect to the transceiver. In many phase shift systems in order to determine the direction of a moving object they are designed to have a non-zero intermediate frequency with a stationary object, and the direction of motion can be determined by observing if the intermediate frequency increases or decreases. In this embodiment the intermediate frequency is zero (a static object produces a static output), but the direction of a moving object can still be determined by how the gate phases move from low to high detection efficiency. For instance if after the "c" phase has a high detection efficiency then either the "d" or "b" phase will be the next to have a high detection efficiency, indicating the direction of propagation.

Figure 5:
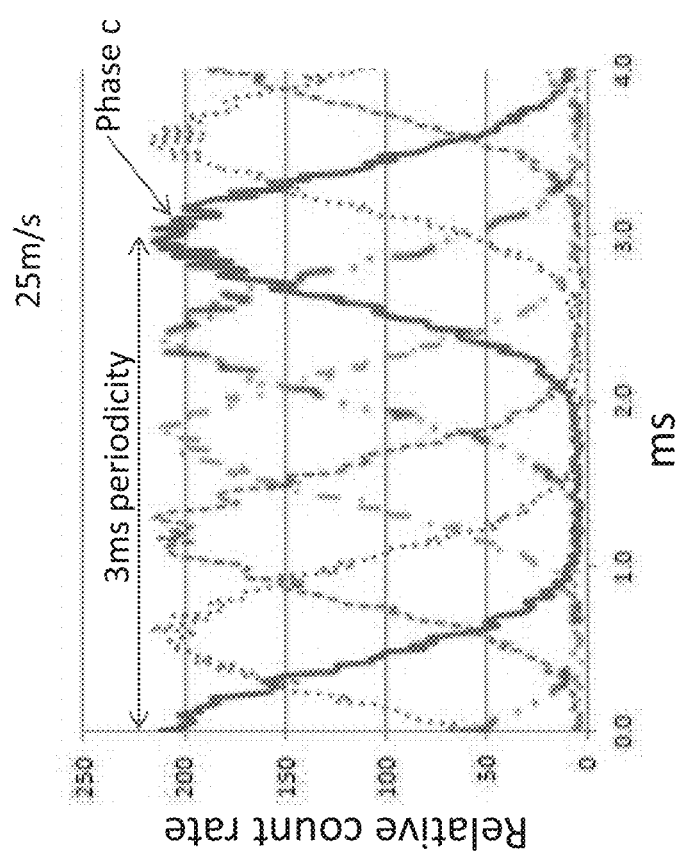
FIG. 5 shows how the expected relative count rate varies with time in five different phases (phase c is the solid line) when the object is moving at 25 m/s with respect to the transceiver.

FIG. 5 shows a simulation of how the count rate in five different detection phases varies with time when the object is moving with respect to the transceiver by 25 m/s. The results are modeled based on the temporal detection efficiency depicted in FIG. 3. Each measurement in the graph is for 0.01 ms with −80 dBm received power at 1550 nm optical wavelength. A noise level of the square root of the number of counts is added to the graph to indicate the approximate noise levels expected based on Poisson counting statistics. A given gate phase repeats itself every 3 ms since a 2π shift is 7.5 cm and 7.5 cm/3 ms=25 m/s.

The faster an object is moving the shorter the periodicity of the processed gate phase count rate. For very fast moving objects, the frequency of the modulation of the gate phase detection efficiency rate may be so fast that they can no longer be accurately measured since so few counts are recorded. The processor can then modify M to slow the frequency with which the detection efficiency is modulated to keep it within an optimal range. If the object is moving towards the system then M can be reduced to reduce the gate phase modulation while if the object is moving away from the system then M can be increased to reduce the modulation frequency of the processed gate phase signal.

If one or more of the gate phases are deemed to be in a nonlinear counting regeme the processor can change the DC bias to the APD so as to reduce its detection efficiency changing the counting rate in each gate phase so as to be more linear. This can improve the accuracy of comparing the count rates in each of the gate phases, especially if more than one gate phase is saturated. Alternatively, the amount of saturation can be factored into the relative detection efficiency calculations or multiple measurements at multiple SPD detection efficiencies (for instance controlled by changing the DC bias or the size of the gate voltage to an APD) can be processed so that some of the gate phases are in the linear regime in at least some of the measurements.

The modulator 102 can be realized with an external modulator such as a lithium niobate Mach Zehnder modulator, or it can be realized by other means including directly modulating the current to a laser diode (in which case it would not require a separate physical block from the laser itself). The optical modulation used to clear up the 2π distance ambiguity can be of a number of means (other than a data pattern imparted on each optical pulse) such as a modulation of the pulse intensities at a rate much less than the pulse rate. For instance a small sinusoidal modulation at a 500 kHz rate could be used and the phase of the 500 kHz modulation can be measured at the transceiver using the SPD count statistics. The processor could add up all the photon counts in all the phases that are measured in a time of ~0.1/500 kHz to sample the 500 kHz signal and determine its phase shift relative to the 500 kHz signal at the transmitter. Alternatively the ambiguity extending signal can be detected using a secondary linear APD to extend the range ambiguity to (1/500 kHz)*3×10$^8$/2=300 meters. The optical signal for the secondary linear APD could be wavelength division multiplexed with the pulsed optical signal and wavelength division demultiplexed before detection. Note that the secondary APD can be a linear APD since the resolution of the ambiguity extending measurement is much less than the resolution of the single photon detecting measurement. The bandwidth of the secondary APD would be relatively narrow thus allowing for low noise levels.

The pulse repetition rate can be made substantially smaller than the gate repetition rate while sill preserving the desired situation where no optical pulse phases ever have negligible detection efficiency for all the gate phases if $f_G = M \cdot f_m$ where $M=(I_4+f_G \cdot \tau_G \cdot s)/I_3$, where $0<|s|<0.1$ is a system parameter, and $I_3$ and $I_4$ are the two smallest integers for which the relationship holds, since in this case the optical pulses and the gates do not exactly but do approximately repeat their relative positions every $I_4$ gates, and over time the pulses and gates walk off each other so that a negligible detection efficiency can only be observed for a finite time period. This may slow down the data collection since the pulse rate is slower but will allow for multiple gates to arrive between pulses. The counts recorded by these gates can be ignored thereby reducing after-pulsing effects. If M=5 and s=0 (here we intentionally choose an inappropriate s value) then the DSP can safely ignore the next four gates after a detection event without losing any signal, as the next four gates will not be coincident with an optical pulse. Such a time frame can be adequate to reduce afterpulsing for GHz rate gated Geiger-mode APDs to levels that are small enough to ignore. However, in such a configuration a fixed non-moving object will generate a return-pulse that may fall in-between two gates and therefore not be well detected (in fact this will happen most of the time).

An improved design could select M=496/99, where $\tau_G$=127 ps, $\tau_G$=50 ps, and $f_G$=2.5 GHz. This is equivalent to setting M=(5+0.3175·s)/1 which is true for $I_4$=5, $I_3$=1 and s=0.031814 which satisfies the specified constraint. We can set L=$I_4$=5 to have 5 sub-signals. To ensure the pulse rate is relatively low and that dead time does not unduly affect the SPD count statistics we want $I_4 > I_3$, and $I_2/f_G$ being equal to or larger than the dead time of the optical receiver, both conditions being satisfied in this example. The four gates following a detection event are still empty when measuring a reflection from a single object giving the detector time to recover. The optical pulse will drift into the detection window of a particular gate index every $\sim 1/(s \cdot f_G \cdot \tau_G)$ gates (99 gates) and maintain relatively high detection efficiency for about 1/s gates (~31 gates).

Figure 6:
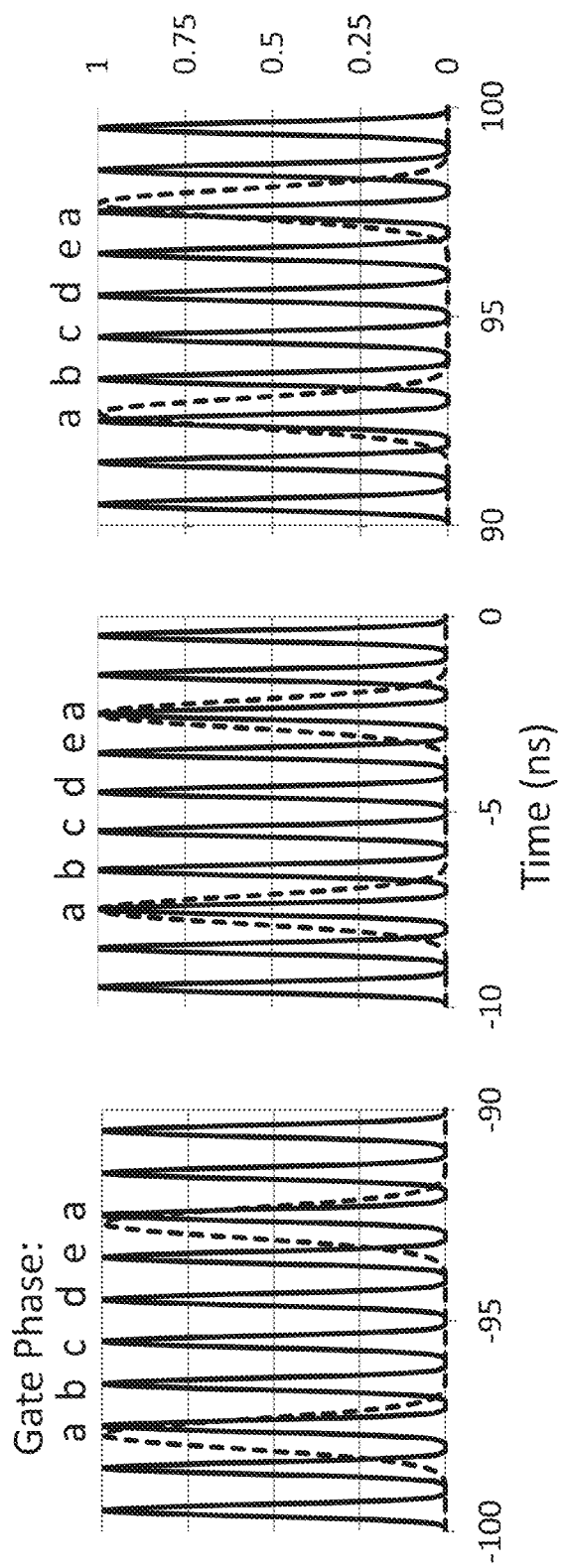
FIG. 6 shows the temporal positions of the gate and optical return pulse for a low gate rate system.

For another example if $f_G$=1 GHz then $f_p$=99/496 GHz, thus each gate is spaced by 1 ns in time and each pulse is spaced by 5.010101 . . . ns in time. This is depicted for several time segments in FIG. 6. The pulse moves with respect to a gate phase by 0.0101 . . . ns every pulse. If the pulse is overlapped with a particular gate phase, then in 99 pulses it will become overlapped with the next gate phase. In this example the gate phase will shift by one every (1/99)*(99/496)=2.016 MHz or 496 ns. If the gate has a temporal window of ~300 ps then a particular gate phase will be illuminated by optical pulses for about 30 consecutive optical pulses before they start to substantially walk off each other. FIG. 6 shows a simulation of how the relative location of the optical and gate pulses change over time.

Figure 7:
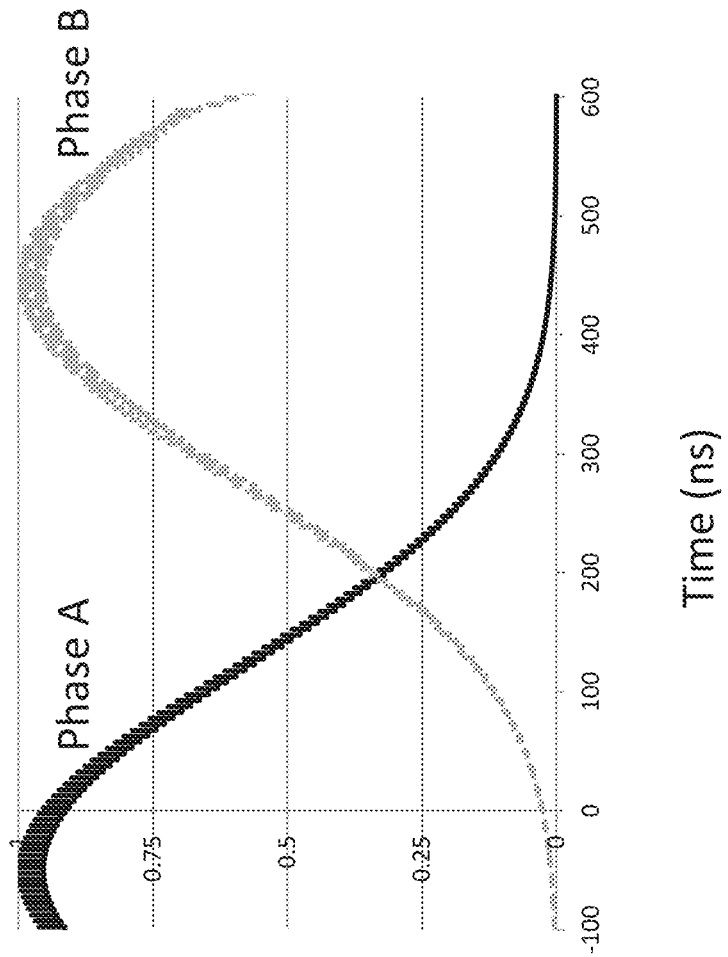
FIG. 7 is the associated normalized detection efficiency as a function of time for gate phase A and gate phase B after filtering with a temporal square filter that averages the detection efficiency over 100 ns.

FIG. 7 shows a plot of the approximate average detection efficiency (averaged over 100 ns and normalized to one) for two gate phases as a function of time. The gate phase moves from "a" to "b" over a duration of 496 ns or 2.016 MHz. If the object is moving, however, the frequency in which the gate phases evolve will be modified thus allowing the movement (velocity) to be measured.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks. Other variations and embodiments are possible in light of above teachings, and it is thus intended that the scope of invention not be limited by this.

What is claimed is:

1. An apparatus for determining a range information from a transceiver to an object by measuring a phase of a modulated optical signal, comprising:
    a transmitter transmitting the optical signal modulated with a modulation frequency $f_m$ and generating optical pulses of temporal half-width of $\tau_p$ towards the object;
    a receiver receiving a reflected portion of the modulated optical signal, the receiver contains a single photon sensitive optical receiver with an optical detection efficiency that is modulated at a gate frequency $f_G$ with a gate creating a temporal optical detection efficiency half-width of $\tau_G$, the frequency $f_G = M \cdot f_m$ where $M = I_2/I_1$ and $I_1$ and $I_2$ are relatively prime integers greater than one; and whereas $I_2/f_G$ is nearly equal to or larger than the dead time of the optical receiver; and
    a processor to determine the range information of the object.

2. The apparatus of claim 1, wherein $\tau_p$ is greater than or about equal to $(1-\tau_G \cdot f_G)/(2 \cdot f_G \cdot I_1)$, where the constraint on the optical pulse width provides a non-negligible detection efficiency for at least one of $I_1$ consecutive optical pulses regardless of a phase shift (temporal position) of the optical pulses with respect to the gates.

3. The apparatus of claim 1, further comprising:
    the single photon sensitive optical receiver comprised of at least one avalanche photodiode (APD) operating in Geiger mode.

4. The apparatus of claim 3, wherein an output signal from the APD and a reference signal are both input to a subtraction element, and an output of the subtraction element is an input to a digitizer, the reference signal comprised of a sinusoidal frequency of $f_G$ and configured in amplitude and phase so as to subtract out an unwanted feed-through signal from the APD to isolate a small Geiger breakdown signal from the APD output signal.

5. The apparatus of claim 1, wherein a peak detection efficiency of a single photon detector (SPD) being a part of the single photon receiver is controlled by a digital signal processor (DSP) to adjust a resulting peak photon detection efficiency in order to maintain the SPD in a low-saturation photon counting regime for a wide range of received photon flux levels.

6. The apparatus of claim 1, wherein an output of the single photon sensitive optical receiver has a digital output, the digital output of a single photon detector (SPD) being sent to a digital signal processor (DSP), the DSP segmenting the signal into $L=I_2$ time multiplexed digital sub-signals; the DSP digitally processing L sub-signals and using the L digitally processed sub-signals to determine the phase of the received optical signal.

7. The apparatus of claim 6, where the frequency $f_G$ is a variable frequency under a control of the DSP.

8. The apparatus of claim 6, wherein the modulated optical signal is detected after reflection from an object, and a rate of change of the range or velocity of the object is determined by processing time multiplexed sub-signals.

9. The apparatus of claim 8, wherein M is under control of the DSP, whereas M is modified by the DSP as needed to keep the frequency modulation of digitally processed time-multiplexed sub-signals in a desired operating range.

10. The apparatus of claim 6, wherein the modulated optical signal includes an additional modulation with frequency components lower than $f_m$ that is detected at the receiver in order to extend an unambiguous range over which the object distance can be determined.

11. The apparatus of claim 6, wherein $\tau_G > \tau_p$ so that there is a high detection efficiency for optical pulses that overlap in time with detector gates providing a high contrast between a detection efficiency of the L sub-signals.

12. A method for determining a range information from a transceiver to an object by measuring a phase of a modulated optical signal, comprising:
    sending the modulated optical signal comprised of a series of short optical pulses towards the object;
    receiving a series of short optical pulses at a pulse repetition frequency, a portion of the optical signal being detected in a single photon detector (SPD), the SPD being time gated at a frequency not equal to an integer multiple of the pulse repetition frequency, the SPD preferentially detecting photons during a time gate with a resulting detection efficiency having a known shape as a function of time where the shape of the detection efficiency is used to help measuring the phase of the optical signal; and whereas the pulse repetition frequency and the gate frequency are such that any two optical pulses that both temporally overlap with time gates are far enough apart in time to keep the photodetector saturation low, thus maintaining a high SPD linearity; and
    processing data on the phase measurement to receive information about the range or velocity of the object.

13. The method of claim 12, wherein the gated outputs of the SPD are segmented into an integer number of time multiplexed sub-signals, with the integer number being equal to a number of gates after a first optical pulse overlaps with a gate until a subsequent optical pulse overlaps with a subsequent gate such that the first and the subsequent optical pulses are detected with high detection efficiency.

14. The method of claim 12, wherein the optical signal is transmitted to an object, and a phase of the reflected optical signal from the object is measured by processing time multiplexed sub-signals and the phase is used to determine a distance to the object.

15. The method of claim 12, wherein a peak detection efficiency of the SPD is modified in order to keep multiple time multiplexed sub-signals from becoming saturated.

* * * * *